July 28, 1959 — W. E. REED ET AL — 2,896,875
MOTOR DRIVE FISHING REEL
Filed Oct. 29, 1956

INVENTORS:
RALPH J. CUMMINGS
WILLIS E. REED
BY
ATT'Y

United States Patent Office 2,896,875
Patented July 28, 1959

2,896,875

MOTOR DRIVE FISHING REEL

Willis E. Reed, Cicero, and Ralph J. Cummings, Berwyn, Ill.

Application October 29, 1956, Serial No. 618,774

9 Claims. (Cl. 242—84.53)

This invention relates in general to a fishing reel driven by a small motor and without any fishing pole. Although intended particularly for ice fishing, it also provides a useful reel for summer pan fishing, from boats, bridges, docks and other places where long casts are not required.

The invention comprises a small powerful motor connected to a line winding reel and both mounted upon a short, hollow handle resembling a flashlight which may be portable and carried in a coat pocket. The motor uses very little current and may be powered by two or more flashlight cells depending upon the length of the carrying case.

An important object of the invention is to provide a portable motor driven fishing reel for retrieving a line, bobber and a catch from any depth.

A further object of the invention is to provide a motor driven fish line reel which prevents the line from being frozen to a pole while ice fishing, by omitting the necessity of pole eyelets which tend to collect water and freeze closed, engaging the line.

Still a further object of the invention is to provide a light and portable motor driven fishing reel which has a small electric motor and two or more flashlight cells mounted in a light, hollow, plastic case.

Still a further object of the invention is to provide a combined switch control and brake for the winding reel in which the switch closing arm for the motor has a brake arm for engaging the reel when the motor is shut off.

A further object of the invention is to provide a brake arm control for the motor and reel winding drum in which the switch arm has a brake bar spring pressed into engagement with the line winding spool so that a hook at the end of the winding line may be set when a strike is made and the line rewound when the spring pressure is overcome.

A still further object of the invention is to provide a light-weight motor drive fishing reel which is both powerful and sufficiently compact to be carried in the pocket or tackle box of a user.

Figure 1:
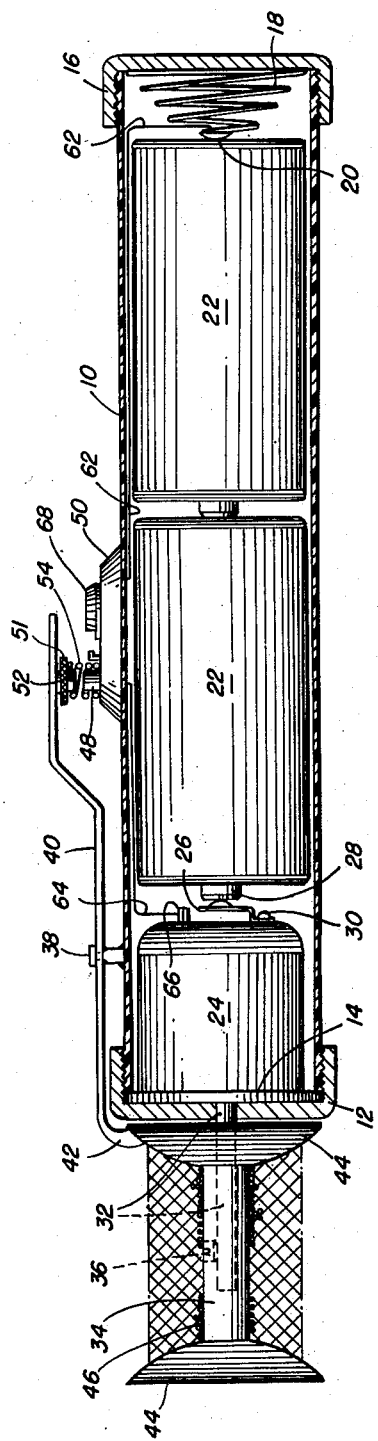
Figure 2:
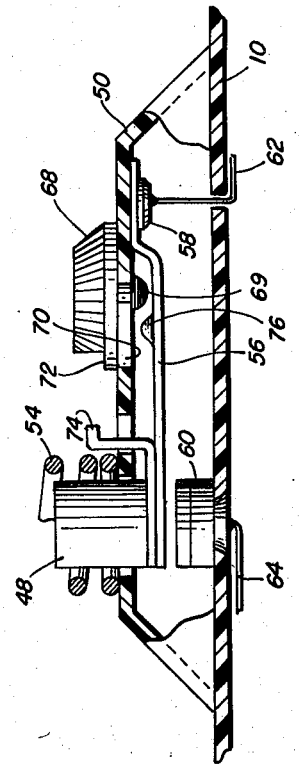

Other objects of the invention will appear in the specification and will be apparent from the accompanying drawings in which Fig. 1 is an elevational view with some of the parts in section of a motor drive fishing reel in accordance with this invention; and Fig. 2 is a detail sectional view showing the switch controlling means for the motor.

Ice fishing is frequently done from a small house overlying a hole in the ice. This precludes the possibility of using a fishpole of much length, and the present invention is particularly useful in raising or withdrawing a fishing line under these conditions. By winding the line on a reel instead of manually withdrawing it, the line is maintained in a clear unfouled condition; it does not lie or become coiled upon the ice, there are no pole eyelets which may be frozen closed, and thus the line is less likely to become frozen or tangled when it is reeled in. The line is dropped as desired by releasing the reel and allowing the weight near the hook end to carry the line downwardly.

Referring now more particularly to the drawing, a case 10 is preferably made of suitable plastic material having threaded ends with a cap 12 for one end adapted to hold a metal motor supporting plate 14 against this end of the case, and with a cap 16 threaded on the other end and engaging a spirally coiled spring 18 which carries a contact 20 to engage one end of a dry cell battery 22 the other end of which in turn engages the bottom of a similar cell with others similarly mounted in series in the case 10 if desired or necessary.

Attached to the motor mounting plate 14 is an electric motor 24 having a spring contact 26 at its inner end engaged by a central contact 28 at the adjacent end of the inner battery cell 22. The spring 26 is connected to one of the motor terminals 30.

The motor has a drive shaft 32 which extends freely through the mounting plate 14 and the end cap 12 and forms an axle for a reel spool 34 into which it extends and is secured by a set screw 36 or any other suitable means. The spool may be driven directly by the motor shaft as shown or through a gearing connection with the shaft 32.

Mounted on the outside of the casing 10 near the motor end by means of a pivot pin 38 projecting from the casing is an operating lever 40 which has a brake arm extending over the cap 12 and toward an inwardly convex end piece 44 at the end of the spool 34 so that when the opposite end of the lever 40 is pressed outwardly, the brake arm 42 is pressed against outer marginal edge of the inner concave surface 44 of the spool. Both ends of the spool are concave at the inner surface and the inner end of the spool fits under the brake arm close to the cap 12 thus preventing a line 46 mounted upon the spool from becoming fouled between the spool and the mounting plate 14 or the supporting cap 12.

At the other end of the lever 40 is a push button 48 mounted in a hollow boss 50 formed integral with or secured to and projecting from the casing. Surrounding the push button at the outside of the boss, and centered and retained by a projection 52 at the under side of the operating lever 40 is a coil spring 54. This spring tends to press the adjacent end of the lever 40 outwardly and to press the brake arm 42 in engagement with the line winding spool 34. The projection 52 may be threaded to receive a knurled nut 55 which engages one end of the spring 54 to adjust the tension of the spring, thus varying the pressure of application of the brake 42 and also of the operating lever 40.

The spring 54 does not depress the push button 48 but the push button is mounted at the free end of a flat spring 56, the outer end of the button projects freely through an opening in the boss 50, and the other end of the spring is fixed to the under side of the outer wall of the boss 50 by a rivet 58. In the path of the flat spring but normally spaced therefrom and attached to the casing within the boss is a fixed contact 60 so that when the push button is depressed by engagement with the projection 52 of the lever 40, the flat spring 56 engages the fixed contact, and being of metal, forms an electrical connection therewith. The spring is connected at its fixed end to a conductor 62 which extends within the casing 10 to the end spring 18 and its contact plate 20 for contact with the bottom of the adjacent battery cell 22 and the fixed contact 60 is connected by a conductor 64 which extends along the inside of the case 10 and is connected to a motor terminal 66. Closing of the circuit through the push button switch spring 56 thus closes an energizing circuit through the batteries and through the motor terminals 30 and 66.

In order to maintain the push button 48 in a down or energizing position, a finger engageable knob 68 is slidably mounted by a headed stud 69 to slide along a slot 70 which forms a guideway. The knob has means for engaging the push button 48 and holding it downwardly. This means may be represented by a projection 72 from the knob adapted to engage under the bent end of a fixed projection 74 of the push button to prevent it from being pushed downwardly in a position to make contact with the fixed contact 60.

Intermediate the ends of the guideway slot 70, the push button spring 56 has a projection 76 adapted to be engaged by the stud 69 when the knob 68 is moved in the slot, to depress the spring and move its push button end into fixed engagement with the fixed contact 60 and thus to maintain the electrical connection for operating the motor 24 as long as the projection engages the stud without manually holding them together. At this time the adjacent end of the operating lever 42 may be partially depressed to raise the brake arm from its engagement with the reel 40. When the stud 69 is moved beyond the projection 76 toward the push button, the projection 72 of the knob 68 is moved under the bent end 74 of the fixed projection of the push button and prevents it from being depressed and from making an electrical connection for the motor.

With this switch construction, a circuit for the motor may be closed by depressing the operating end of the lever 40 so that the projection 52 engages the end of the push button and moves its mounting spring 56 against the fixed contact 60 or the finger knob 68 may be moved toward the push button engaging the push button and holding it downwardly until the finger slide is drawn backwardly in the guideways 70.

When the finger knob 68 is moved into engagement with the bent projection 74 of the push button, no circuit can be closed through the push button switch even though the operating lever 40 is sufficiently depressed against its spring 54 to engage the push button 48. The operating switch 40 may be partially depressed against its spring 54 to free the brake arm 42 from engagement with the reel 40 thus allowing the rotor portion of the motor and the spool to which it is attached to turn freely, allowing the bait and the weighted line to be lowered to any desired depth. When manual pressure is relieved from the operating lever 40, the spring 54 forces the arm 42 into engagement with one edge of the winding spool 34 thus stopping the reel from unwinding, so that the depth of the hook may be set or stopped when a strike is made.

In reeling in the line for any purpose, the operating lever is depressed to engage the push button 48, thus closing an energizing circuit to the motor, or if desired, the finger slide may be moved to engage the push button and hold it in continuous connection with the fixed contact 64 until the line is sufficiently or completely wound upon the reel. For carrying the entire assembly in the pocket, or in tackle box, the knob 68 may be moved to its safety catch position preventing the motor circuit from being accidentally closed, energizing the motor, and exhausting the batteries.

With this construction, it is a simple matter to unreel a line from the spool by simply releasing the operating lever and the brake engagement with the spool, and to wind or retract the line, the operating lever is depressed a slightly greater distance engaging the spring and operating the motor 24 as described.

While we have described a preferred embodiment of the invention in some detail, it should be regarded by way of illustration and example rather than as a restriction or limitation of the invention since various changes may be made in the construction, combination and arrangement of the parts without departing from the spirit and scope of the invention.

We claim:

1. In a motor drive fishing reel, a hollow casing, an electric motor and battery cells therefor mounted end to end in the casing, a line winding reel connected to the motor and projecting endwise therefrom at the end of the casing, switch means including a lever at the outside of the casing for closing a circuit to the motor from the battery cells for rotating the reel and the lever having a brake arm to engage the reel tending to stop it, a switch closing device at one end of the lever having a spring engaging and tending to move the lever and open the switch, pivoting means intermediate the ends of the lever, and the brake arm at the other end extending over the end of the casing and moved into engagement with the reel by the spring at the opposite end of the lever.

2. A motor drive fishing reel in accordance with claim 1, in which the switch means and the lever are mounted at the outside of the casing with the contact closing end of the lever adjacent the longitudinal center of the casing to leave a hand holding portion at the end of the casing opposite the reel and the switch means including a push button engaged by the lever when the lever is pressed against the bias of its spring.

3. In a motor drive fishing reel in accordance with claim 2, the push button being mounted in a hollow boss at the outside of the casing and having mounting means including a projection, and a finger slide knob mounted on the outside of the boss having an extension to engage the projection of the push button for maintaining the push button in an open switch position independent of the operating lever.

4. In a motor drive fishing reel in accordance with claim 2, the push button being mounted upon a flat spring depressed by the movement of the operating lever, a fixed contact in the path of the flat spring and engaged when the push button is depressed, conductors connected from the motor to the fixed contact and from the flat spring of the push button to one end of the battery cells in series, and the other end of the last battery cell being connected to the motor for energizing it when the push button is depressed.

5. In a motor drive fishing reel in accordance with claim 3, in which the push button is mounted on a spring electrically connected within the casing to one end of the battery cells connected in series, a fixed contact on the casing spaced from the push button spring and connected by a conductor within the casing to one of the motor terminals, the other end of the battery cells connected in series being connected to another motor terminal, and the push button being depressed by the operating lever for engagement with the fixed contact and the projection of the push button being engageable by the finger slide knob for holding the push button open independent of the operating lever.

6. In a motor drive fishing reel in accordance with claim 5, the motor being mounted on a plate and secured with the reel by a cap threaded on the casing at one end, and the batteries being held in end to end series relation within the casing and having a spring contact secured in place at the end of one of the cells at the opposite end of the casing with a screw threaded cap securing the spring contact and batteries in place.

7. In a motor drive fishing reel in accordance with claim 1, means comprising a projection from the lever for centering the spring and a nut adjustable on the projection and engaging one end of the spring to vary the tension of the spring against the lever and on the brake arm.

8. In a motor drive fishing reel in accordance with claim 4, the flat push button spring having a projection, and a finger slide knob having a stud movable to engage the projection from one side and to slide over the projection, the knob having a projection and the push button a hook engageable by the projection when the stud is at one side of the said projection to hold the push button against movement.

9. In a motor drive fishing reel in accordance with claim 4, a finger slide knob having a casing slot and a beaded stud for retaining it in the slot, the flat push button spring having a projection intermediate the ends of the slot and engageable by the stud to close the push button switch in the intermediate position, the stud being free from engagement with the projection when positioned at either side thereof, in one side position of the stud, the flat push button spring being free for engagement with the fixed contact, and in the other side position of the stud and the attached finger slide knob, the knob having a projection and the push button having a bent extremity engaged by the knob projection to prevent the depression of the push button and to prevent engagement with said fixed contact for closing a circuit to the motor.

References Cited in the file of this patent

UNITED STATES PATENTS

| | | |
|---|---|---|
| 769,142 | Atkinson | Sept. 6, 1904 |
| 902,447 | Piper | Oct. 27, 1908 |
| 955,366 | Simons | Apr. 19, 1910 |
| 2,079,356 | Lukowski | May 4, 1937 |
| 2,262,637 | Fanshier | Nov. 11, 1941 |
| 2,475,750 | McCormick et al. | July 12, 1949 |
| 2,493,766 | Luton | Jan. 10, 1950 |
| 2,720,951 | Olson | Oct. 18, 1955 |
| 2,779,832 | Winters et al. | Jan. 29, 1957 |